United States Patent Office 2,929,725
Patented Mar. 22, 1960

2,929,725

PROCESS OF CANNING WHEAT

Michael J. Copley, Berkeley, Dale K. Mecham, Richmond, Nathan Eli Weinstein, Berkeley, and Robert E. Ferrel, Richmond, Calif., assignors to the United States of America as represented by the Secretary of Agriculture No Drawing. Application March 6, 1959
Serial No. 797,815

5 Claims. (Cl. 99—182)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its prime object the provision of novel methods for canning wheat. Further objects and advantages of the invention will be evident from the following description wherein parts and percentages are by weight unless otherwise specified.

For the most part, wheat is utilized in the form of flour and similar products. However, some wheat is consumed in the form of whole or broken grains. Thus the product known as bulgur is an important staple food, particularly in the Near East. Bulgur is essentially parboiled dried wheat which has culinary uses similar to those of rice. In recent years this product has been introduced into this country and is becoming increasingly popular. Although bulgur is a flavorsome and nutritious food it has the disadvantage that its preparation for the table requires considerable time and some degree of skill on the part of the cook. The point is that the product must be cooked to such an extent as to tenderize the grains but the cooking period must not be prolonged to such an extent that the starch granules in the wheat burst to produce a sticky product. Usually, the proper cooking of the bulgur requires boiling it in water for 20–40 minutes and care is always required to avoid over-cooking thus to prevent formation of an unpalatable, sticky product. Also, precautions must be taken to prevent the grains from sticking to the hot surfaces of the cooking vessel and thus developing offensive odor and taste. These disadvantages have, to a large measure, limited the popularization of bulgur.

By application of the present invention, the disadvantages enumerated above are obviated. The canned wheat product merely needs to be heated in water for a few minutes to make it ready for the table. No culinary skill is required in preparing it for consumption. Despite this rapidity and simplicity of preparation for the table, the product exhibits a complete separation of grains, i.e., there is no tendency toward stickiness. In addition, the odor, flavor and texture of the product are virtually indistinguishable from a dish of properly cooked, high quality bulgur.

The objects of the invention are attained by a procedure which comprises partial de-branning of wheat grains, moisturizing of the partially de-branned grains, sealing of the moisturized grains in containers, and heat processing the product to sterilize it so that it will keep indefinitely. The individual steps are described in more detail below.

In the initial step, the wheat grains are partially de-branned by which is meant that the grains are treated to strip off at least the outermost bran layer without removing all the bran layers. The resulting grains still retain the innermost bran layer and may in addition retain one or more of the intermediate bran layers. These physical changes can be readily understood by consideration of the structure of the wheat grain. Thus the wheat grain or berry, after threshing to remove the husk, consists of a starchy endosperm to which is attached the germ and a bran envelope surrounding the endosperm and germ. This bran envelope is generally regarded as consisting of six distinct superposed layers or coats. In the partial de-branning step, the outermost bran layer is removed and in addition one or more of the intermediate bran layers may be removed thus producing a grain with the endosperm and germ intact and retaining the innermost bran layer. The partially de-branned grain may also retain one or more of the intermediate bran layers.

The partial de-branning step has the significance of providing a grain in such form as to yield a final product of optimum properties from the standpoint of texture and grain separation. Thus if the bran is completely removed, the individual grains in the final product stick to one another. On the other hand, if none of the bran is removed, the grains in the final product have an undesirable tough texture. However, by employing partially de-branning, the final product exhibits non-coherence of individual grains coupled with proper texture for edibility.

The step of partial debranning may be carried out in any of the conventional ways described in the literature. These procedures usually involve an application of mechanical forces to a body of the wheat grains to cause a repetitious rubbing of the grains against one another and against the surfaces of the vessel in which they are contained. Regardless of what type of apparatus is used precautions should be exercised to minimize breaking or even scarring of the grains. Both of these effects are undesirable as they will expose portions of the endosperm leading to stickiness in the final product. Preferably, the agitation of the grains is carried out in a body of water. This has the advantage that the water acts as a lubricant or cushioning medium and reduces injury to the grains. Thus the use of water facilitates the desired aim of producing partially de-branned grains wherein the endosperm and germ are essentially intact and free from scarring. Agitation in a body of water is also beneficial in that it permits separation of the removed bran by a flotation effect. Prior to applying the de-branning step, the grains may be soaked in water for a minute or so to facilitate removal of the outer bran coats.

In the next step, the partially de-branned grains are moisturized. This step simply involves contacting the grains with water until their moisture content is at a certain level. It has been observed that the moisture content of the grains has a significant effect on the properties of the final product. Thus for example as the moisture content is increased the time required for preparing the product for the table is decreased. However, if the moisture content is too high the grains tend to split during the moisturizing step thereby forming an agglomerated, gummy final product. By moisturizing to the extent that the grains assume a moisture content of 40 to 60%, preferably 50 to 55%, excellent results are attained in that the final product combines the desirable properties of rapidity of preparation for the table coupled with freedom from splitting and agglomeration.

In carrying out the moisturizing step, the grains are contacted with water at ordinary or elevated temperatures, for example, from 20 to 100° C. Naturally, the absorption of moisture by the wheat will take place more rapidly at elevated temperatures. For example one sample of partially de-branned wheat reached a moisture content of 50% in 120 minutes at 65° C., whereas at 75° C., the same moisture level was reached in but 48 minutes. Also, the rate of water absorption will be influenced, but to a lesser extent, by the degree of de-branning. Thus grains which retain solely the innermost bran coat will imbibe water faster than those which retain one or more intermediate bran layer in addition to the innermost one. If desired, the moisturizing step can be effected by first soaking the grains in water at about room temperature then holding them in hot water until the aforesaid moisture level is reached.

Any desired water-soluble food ingredient or flavoring can be added to the water used for moisturizing whereby to incorporate such ingredient by absorption into the wheat grains. For example, to the water may be added such food ingredients as salt, monosodium glutamate, meat extract, protein hydrolysates, tomato juice, or the like.

After moisturizing, the grains are placed in cans or other suitable containers and sealed at atmospheric pressure or while under vacuum. The latter is preferred as it minimizes the proportion of air in the container whereby development of rancidity on storage of the canned product is minimized. For similar purpose one may invest the cans with nitrogen, carbon dioxide, or other harmless inert gas prior to sealing.

The sealed cans are then subjected to a retorting or autoclaving operation to sterilize the contents and the insides of the cans. This operation is carried out in the same manner as is common to all vegetable canning operations and requires that the cans be subjected to steam under superatmospheric pressure (or equivalent heating medium) to insure destruction of micro-organisms including spores. For example with cans up to 3 inches in diameter, it is advisable to apply a temperature of 240° F. for 60 minutes. In general, temperatures of 220–270° F. applied for times of 30 min. to 120 min. may be used depending on the size of the cans.

To prepare the product for serving, the contents of the can are mixed with sufficient water to raise the moisture content of the grains to about 75% and heat is applied for a few minutes to cause the grains to imbibe the added water.

If desired, other food items such as poultry meat, tomato paste, or other foods or spices or condiments may be added to the moisturized grains prior to placing in cans. In this event, care should be taken that the total moisture content (that present in both wheat and added foodstuff) be within the range of 40 to 60%.

Canned pilafs can be readily prepared by application of the technique of the invention. To this end, the moisturized grains are browned with fat in a hot skillet or the like, mixed with suitable spices, meat, etc., and sufficient water is added to restore that lost in the browning operation. The re-moistening may be accomplished with tomato juice, meat broths, or other edible liquids. The remoistened grains are then packed in cans and heat processed as described.

It is within the purview of the invention to apply antioxidants to the wheat grains prior to canning whereby to minimize development of rancidity on extended storage of the canned product. To this end any suitable fat-stabilizing antioxidant may be added to the grains in a minor proportion, i.e., about 0.001 to 0.1%. The antioxidant may be sprayed onto the wheat grains in solution form or applied by other conventional technique. Illustrative examples of antioxidants which may be used are: tocopherols, i.e., alpha-, beta-, and gamma tocopherol; nordihydroguaiaretic acid; esters of gallic acid such as the propyl, butyl, hexyl, octyl, dodecyl, hexadecyl, and octodecyl esters; esters of ascorbic or isoascorbic acid for instance ascorbyl palmitate; butylated hydroxyanisole; 2,5-ditertiarybutyl hydroquinone; 6-ethoxy-2,2,4-trimethyl-1,2-dihydroquinoline, etc. Chelating agents—such as citric acid, phytic acid, ethylenediamine tetraacetic acid and its salts, etc.—may be incorporated with the antioxidant to enhance the stabilizing effect.

In the preferred modification of the invention, the partial de-branning is carried out prior to the moisturizing step. However, it is within the purview of the invention to partially de-bran the grain subsequent to moisturizing. In this event the imbibition of water will take longer because the water must penetrate through all the bran layers.

The invention is further demonstrated by the following illustrative examples.

*Example I*

A. Three hundred grams of wheat was placed in a household-type electric blender in which the impeller blades had been reversed to avoid cutting the grains. Six hundred grams of water was added and the blender operated for two minutes. The water layer carrying the separated bran was removed by decanting. The grain was washed with water to float off residual bran particles.

An additional sample of the wheat was treated as described above but with different time of agitation in the blender, i.e., 3 minutes.

The two lots of partially de-branned wheat were examined. In both cases the grains were essentially intact, free from scarring, and free from outer bran coats.

*Example II*

The two samples of partially debranned wheat produced as described in Example I were moisturized by soaking in water held at 75–76° C. The water contained 2% salt (NaCl). Both samples were brought to a moisture content of 50% although different soaking times were required due to the different thicknesses of the residual bran layers. The soaking times were as follows:

| | Min. |
|---|---|
| Sample B | 47 |
| Sample C | 31 |

After soaking, the wheat was drained then packed into No. 303 enamel-lined cans using 12 oz. of wheat per can. The cans were sealed under vacuum, heat-processed at 240° F. for 60 minutes, and finally cooled in running water.

The canned products were prepared for eating by adding the contents of each can to a cup of water and heating for about 10 minutes until the water was all absorbed by the grain. The table-ready products were then assigned to a taste panel for evaluation. It was found that both products had excellent odor, taste, texture, and color. In addition the individual grains retained their intact form and were not sticky.

Having thus described the invention, what is claimed is:

1. A process for canning wheat which comprises providing partially de-branned wheat in the form of unbroken grains with at least the outermost bran layer removed but retaining at least the innermost bran layer, soaking said wheat grains in water until the moisture content of the grains is in the range from 40 to 60%, filling the soaked wheat grains at the aforesaid moisture level into containers, sealing the containers, and subjecting the sealed containers to a heat-processing operation to sterilize the contents and the containers.

2. A process for canning wheat which comprises providing partially de-branned wheat in the form of unbroken grains with at least the outermost bran layer removed but retaining at least the innermost bran layer in intact condition, soaking said wheat grains in water until their moisture content is in the range from 40 to 60%, filling the soaked grains at the aforesaid moisture level into containers, sealing the containers, and subjecting the sealed containers to a heat processing operation to sterilize the contents and the containers.

3. A process for canning wheat which comprises subjecting wheat to rubbing action to effect a partial de-branning of the wheat to produce unbroken grains with at least the outermost bran layer removed but retaining at least the innermost bran layer, soaking said grains in water until their moisture content is in the range about from 40 to 60%, filling the soaked grains at the aforesaid moisture level into containers, sealing the containers and subjecting the sealed containers to a heat processing operation to sterilize the contents and the containers.

4. A process for canning wheat which comprises agitating wheat in a body of water to cause a partial de-branning by rubbing action without breaking the wheat grains to produce unbroken grains with at least the outermost bran layer removed but retaining at least the innermost bran layer in intact condition, soaking said grains in water until their moisture content is in the range about from 40 to 60%, filling the soaked grains at the aforesaid moisture level into containers, sealing the containers, and subjecting the sealed containers to a heat processing operation to sterilize the contents and the containers.

5. A process for canning wheat which comprises agitating raw, whole grains of wheat in a body of water to cause a partial de-branning by rubbing action without breaking the wheat grains to produce unbroken grains with at least the outermost bran layer removed but containing the endosperm, germ, and at least the innermost bran layer in essentially intact condition, soaking said grains in water until their moisture content is in the range from 40 to 60%, filling the soaked grains at the aforesaid moisture level into containers, sealing the containers and subjecting the sealed containers to a heat processing operation to sterilize the contents and the containers.

References Cited in the file of this patent

UNITED STATES PATENTS

| | | |
|---|---|---|
| 1,012,979 | Brewster | Dec. 26, 1911 |
| 2,334,666 | Youan-Malek | Nov. 16, 1943 |
| 2,686,130 | Roberts | Aug. 10, 1954 |